(Model.)

2 Sheets—Sheet 1.

R. J. SMITH.
HORSE POWER FOR HAY STACKERS.

No. 398,462. Patented Feb. 26, 1889.

Witnesses:
Jas. E. Hutchinson
Chas. W. White

Inventor:
Ruben J. Smith (Model.)

2 Sheets—Sheet 2.

R. J. SMITH.

HORSE POWER FOR HAY STACKERS.

No. 398,462. Patented Feb. 26, 1889.

Witnesses:
Jas. E. Hutchinson
Chas. W. White

Inventor:
Ruben J. Smith

UNITED STATES PATENT OFFICE.

RUBEN J. SMITH, OF OSCEOLA, IOWA.

HORSE-POWER FOR HAY-STACKERS.

SPECIFICATION forming part of Letters Patent No. 398,462, dated February 26, 1889.

Application filed August 26, 1887. Serial No. 247,984. (Model.)

*To all whom it may concern:*

Be it known that I, RUBEN J. SMITH, of Osceola, in the county of Clarke and State of Iowa, have invented an Improvement in Horse-Powers for Hay-Stackers, of which the following is a specification.

My invention relates to an improvement in horse-powers for hay-stackers.

Heretofore hay-stacking machines and hay-forks have been raised by a horse hitched to the end of a rope or chain and driven straight out from a given point and lowered by backing the horse until the fork was lowered. This method has always been found inconvenient and clumsy; and my invention obviates this inconvenience of having to back the horse to lower the fork.

The object of my invention is to provide a power attachment to hay-stacking machines and hay-forks to raise the fork to the height desired and to lower the same without backing the horse. After the fork is emptied, by the use of my invention it may be lowered quickly and easily without the aid of the horse, thereby saving one-half the time occupied in operating hay-stacking machines by the old method.

Figure 1:
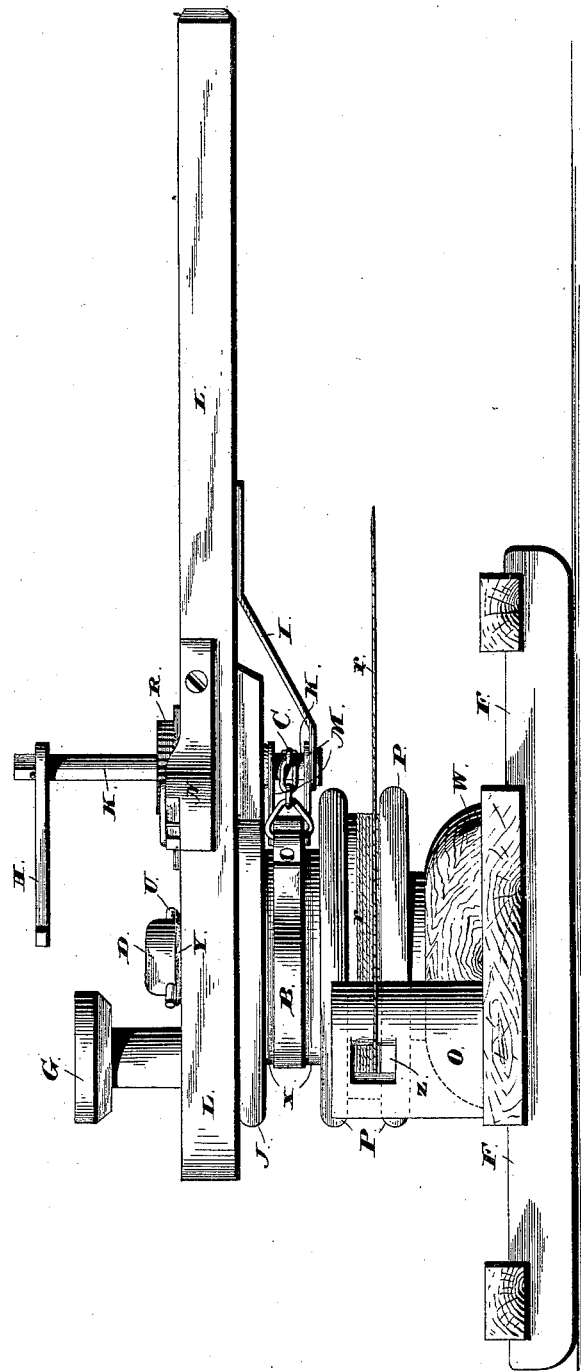
Figure 2:
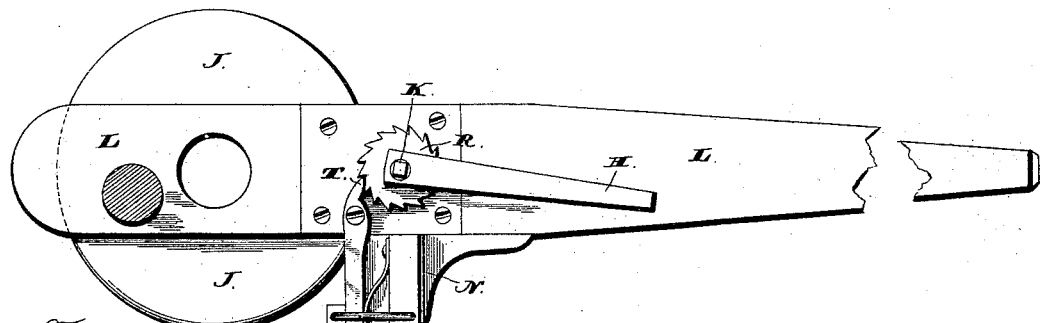
Figure 3:
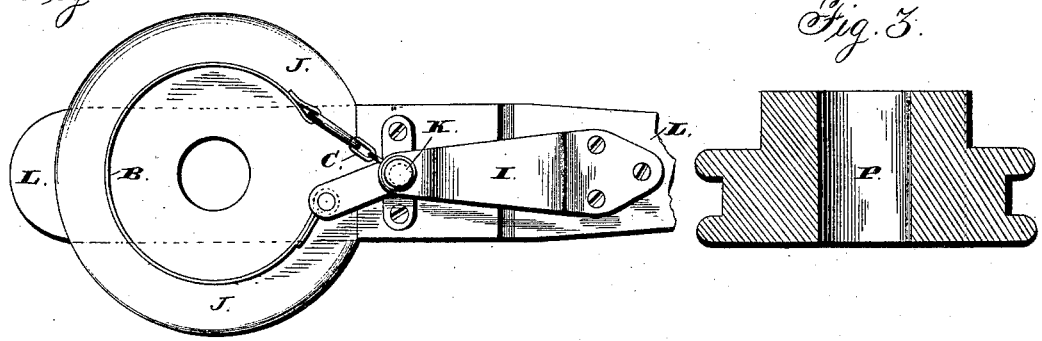
Figure 4:
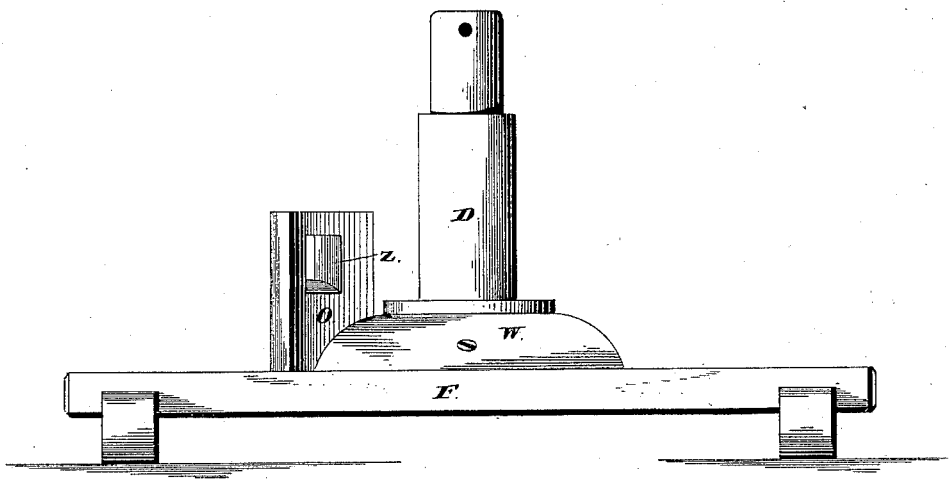

In the accompanying drawings, Figure 1 represents a view of the power attachment to hay-stacking machines and hay-forks, the power-lever extending to the right from the line of vision. Fig. 2 is a view of the power-lever detached, showing ratchet-wheel and tooth and hand-lever to lever-shaft. Fig. 3 is a view of grooved pulley detached. Fig. 4 shows the base-frame and perpendicular standard or axle with power-lever and grooved pulley removed.

F represents a base-frame of convenient size and suitable material, upon which a perpendicular shaft or standard, D, is set, and on which shaft a grooved pulley, P, revolves. The pulley P is provided with a shoulder, X, on its upper side, around which a band-lock, B, passes, one end being attached to a lever-shaft, K, by means of a clevis, M, and the other end to the same shaft by a strong chain, C, which winds onto said shaft inside the clevis. Above said pulley P is a circular disk, J, of the same circumference as the grooved pulley, to which is securely fastened one end of a power-lever, L, both working on the perpendicular shaft or standard, and held in place by a linchpin, U, under which is a washer, Y. The power-lever L is provided with a perpendicular lever-shaft, K, having a ratchet-wheel, R, fastened thereto at the upper surface of the power-lever by a set-screw, a pawl, T, working in the said ratchet-wheel, said pawl having a lever-extension supported by a block, N, said pawl being held in place by a small spring on a shoulder of the block N and held down by the guide.

The lever-shaft K is provided with a hand-lever, H, by which it is turned—to the right for tightening the band-lock on the shoulder X, and to the left for loosening it.

G is the driver's seat; I, a strong brace securely fastened to the under side of the power-lever, in the point of which the lever end of the perpendicular shaft K works. The shaft or standard D is supported at its base by a heavy washer, W, upon which the pulley P rests. In front of the point on the ground-pulley where the rope *r* impinges is a guide, O, to keep the rope from falling from the groove when slack and to keep clothing and limbs from being caught between the pulley and the rope.

My invention is worked and applied in the following manner: The base-frame F is securely staked to the ground at whatever distance from the hay-stacker or hay-fork is most convenient, care being taken to set the same so that the rope *r* will not rub the sides of the guide-slot Z. The rope by which the hay-stacker or hay-fork is worked is attached to the grooved pulley P in such a way that the rope will be taken into the groove. The horse is hitched to the free end of the power-lever L, and when the load is ready to be raised the operator takes hold of the small hand-lever H and turns the shaft K to the right. This draws the band-lock B tightly to the shoulder X, thereby locking the pulley and power-lever securely together. The horse is then started forward, and the rope *r* is wound on the grooved pulley P in the groove. When the fork is raised and emptied, the operator takes hold of the hand-lever H and draws it toward him far enough to release the point of the pawl T and puts his foot against the end of said pawl, forcing it back to the shoulder of the block N, thus allowing the ratchet-wheel to turn freely backward or forward. By the use of the hand-lever H he can tighten or loosen the band-lock at will, and the quickness with which the fork is lowered depends upon the tension of the band-lock on the shoulder of the ground-pulley P. As soon as the fork reaches the ground the band-lock B is again tightened and the machine is ready to raise another forkful.

It is not necessary that the horse be stopped while the fork is being lowered; but as a few minutes usually elapse after one forkful is raised before another is ready it is not necessary to keep him going.

It will be observed that this invention obviates the inconvenience of backing the horse to lower the hay-fork; and it also saves a great deal of time, as by this means the fork can be lowered to the ground at once without the use of the horse.

By using an extra pulley this attachment may be used with almost any of the hay-stacking machines now in use. It may also be used to mow away hay in the barn, attaching the rope by which the hay-fork is raised to the pulley P, the same as to hay-stackers.

I claim—

1. In a horse-power, the combination of the base-frame having the vertical standard, the drum or pulley journaled thereon and having the annular shoulder, the power-lever L, loose on the standard, the shaft K, journaled in said power-lever, the friction-band around the shoulder of the pulley and having one end connected to a fixed part of the power-lever and the other end connected to the shaft K, and the lever to rotate the said shaft, substantially as described.

2. In a horse-power for hay-stackers, the base-frame having a vertical standard, the drum or pulley journaled thereon and having the annular shoulder, the power-lever also loose on said standard, the shaft K, journaled in said power-lever, the friction-band around the shoulder of the drum or pulley and having one end connected to a fixed part of the power-lever and the other end connected to the shaft K, the ratchet-wheel fast on said shaft, the pawl pivoted to the power-lever and engaging said ratchet-wheel, and the lever to rotate the shaft K, all combined and arranged to operate substantially as described.

In testimony that I claim the foregoing I have hereunto set my hand this 2d day of August, 1887.

RUBEN J. SMITH.

Witnesses:
S. S. WICK,
C. W. WHITE.